United States Patent [19]

Yoshimura et al.

[11] Patent Number: 5,140,424
[45] Date of Patent: Aug. 18, 1992

[54] IMAGE SIGNAL PROCESSING APPARATUS WITH NOISE REDUCTION

[75] Inventors: Katsuji Yoshimura, Kawasaki; Yoshitake Nagashima, Chigasaki; Teruo Hieda, Kawasaki; Tadayoshi Nakayama, Tokyo, all of Japan

[73] Assignee: Canon Kabushiki Kaisha, Tokyo, Japan

[21] Appl. No.: 684,478

[22] Filed: Apr. 12, 1991

Related U.S. Application Data

[63] Continuation of Ser. No. 215,823, Jul. 6, 1988, abandoned.

[30] Foreign Application Priority Data

Jul. 7, 1987 [JP] Japan ................... 62-169483
Nov. 5, 1987 [JP] Japan ................... 62-280173

[51] Int. Cl.$^5$ .................. H04N 5/21; H04N 5/238; H04N 5/52
[52] U.S. Cl. .................. 358/167; 358/174; 358/213.15; 358/213.19
[58] Field of Search ........... 358/167, 166, 174, 160, 358/164, 168, 169, 213.15, 213.19, 221

[56] References Cited

U.S. PATENT DOCUMENTS

| | | | |
|---|---|---|---|
| 3,555,181 | 1/1971 | Thommen | 358/174 |
| 4,204,229 | 5/1980 | Heuze | 358/174 |
| 4,365,272 | 12/1982 | Nagai | 358/228 |
| 4,437,123 | 3/1984 | Harlan | 358/166 |
| 4,564,862 | 1/1986 | Cohen | 358/167 |
| 4,667,163 | 5/1987 | Gay | 358/174 |
| 4,835,622 | 5/1989 | Martens | 358/167 |
| 4,851,911 | 7/1989 | Muller | 358/167 |
| 4,901,150 | 2/1990 | Klingelhofer | 358/167 |
| 4,926,261 | 5/1990 | Matsumoto | 358/167 |

Primary Examiner—Tommy P. Chin
Attorney, Agent, or Firm—Fitzpatrick, Cella, Harper & Scinto

[57] ABSTRACT

An image signal processing apparatus inputs a video signal, delays it by one field using a field memory, multiplies the delayed signal by a value K (K less than 1), adds the output from the multiplication to the input signal and supplies the sum to the field memory. The level of the signal read out from the field memory is compared with a predetermined value, and based on the result of that comparison, the video signal being input is substantially inhibited from being supplied to the adding means. The signal obtained by multiplying the immediately-preceding field signal by k, and the present-field signal, are cyclically added, so that the amplitude can be gradually increased. The comparison inhibits addition of a new field signal when the level of that stored in the field memory has reached a predetermined level.

19 Claims, 8 Drawing Sheets

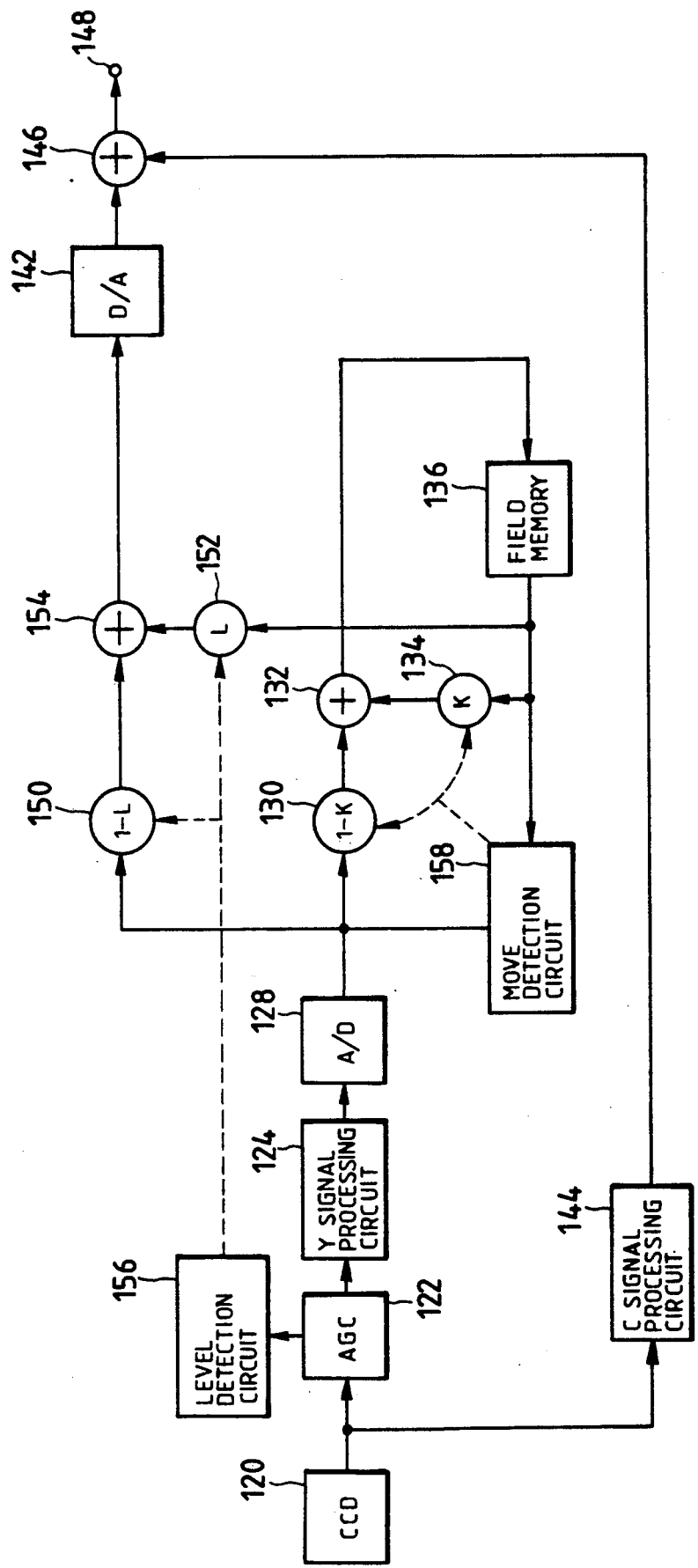

FIG. 13
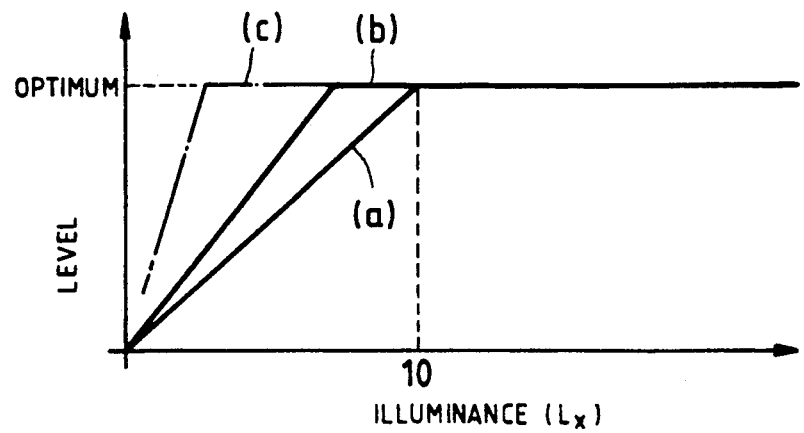
FIG. 14 PRIOR ART
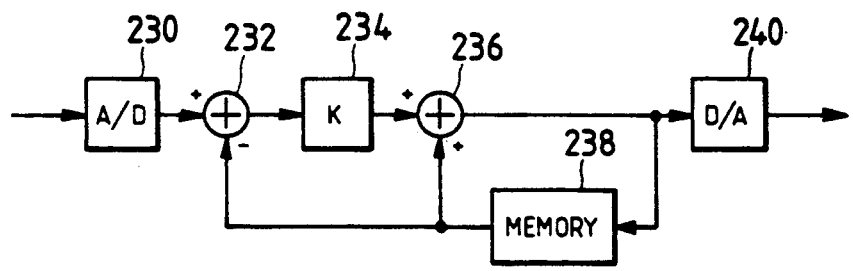
FIG. 15
FIG. 16
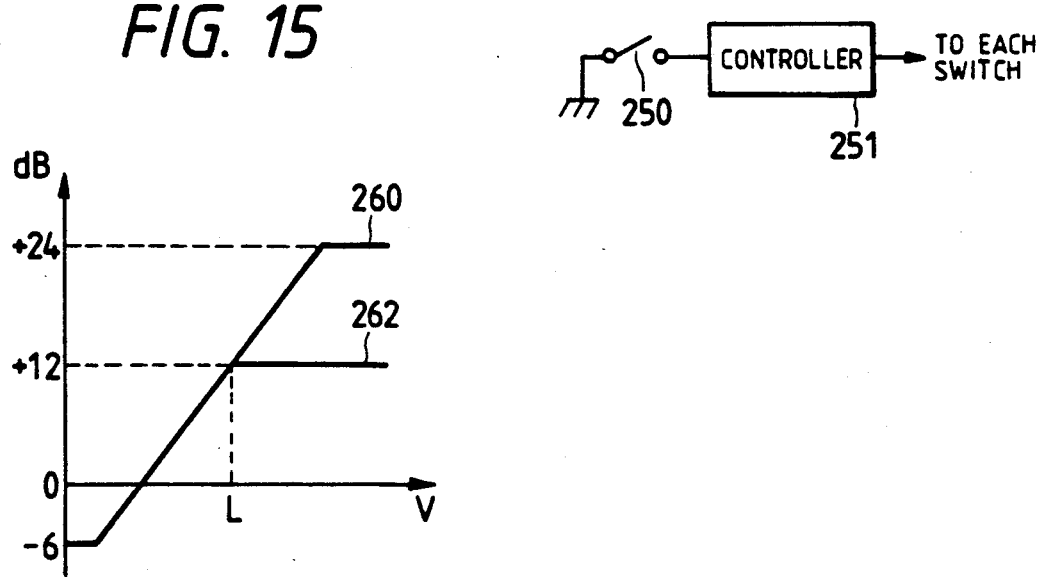

IMAGE SIGNAL PROCESSING APPARATUS WITH NOISE REDUCTION

This application is a continuation of application Ser. No. 07/215,823, filed Jul. 6, 1988 now abandoned.

BACKGROUND OF THE INVENTION

1. Field of the Invention

The present invention relates to an apparatus for processing an image signal obtained from a sensor such as a CCD sensor and, more particularly, to a processing apparatus suitable for reducing noise of the image signal.

2. Related Background Art

Noise reduction utilizing spatial correlation or time-correlation of a video signal is performed in an existing video signal recording/reproducing apparatus to improve as S/N ratio during recording or reproduction. FIG. 8 shows a typical cyclic noise reduction circuit utilizing a field memory. The noise reduction circuit includes a multiplier 110 for multiplying an input with a coefficient $(1-K)$ where K is $0 \leq K < 1$, an adder 111, a multiplier 112 for multiplying an input with a coefficient K, and a field memory 113 serving as a delay element for a one-field period. The transfer function of this digital filter is given as follows:

$$H(Z_f) = (1-K)/(1-KZ_f^{-1})$$

This transfer function exhibits low-frequency filtering characteristics as a function of time (i.e., between fields). In the equation, $Z_f^{-1}$ represents a unit delay operator corresponding to the one-field delay. This circuit reduces noise in a still image portion.

When the memory 113 in the arrangement of FIG. 8 is replaced with a 1H (H is a horizontal scanning period) line memory, a noise reduction circuit utilizing correlation in the vertical direction can be arranged.

In a noise reduction circuit utilizing time-correlation, an after-image is undesirably formed when an object in the image is moving. In a noise reduction circuit utilizing spatial correction, an edge of the image becomes unclear.

A system has recently been proposed to detect a moving portion of an image and its edge to properly change the coefficient K. However, this system is not yet satisfactory in practical applications. In this adaptive control system, image quality is adversely influenced by unclearness of the edge and by an after-image. These adverse influences are often greater than the effect of improving image quality by noise reduction.

When an image signal level is low, an automatic gain control (AGC) circuit is normally arranged in a processing circuit for processing such image signal to amplify the level of the image signal.

When an image pickup element such as a CCD is used as an image signal source, noise of some level is generated at an output unit, e.g., an output amplifier, regardless of the signal level. When the gain of the output signal is controlled by the AGC circuit, the noise level is increased at the same rate as the signal level. When an S/N ratio is low as in photography with a low illuminance, image quality is greatly degraded if the gain is excessively increased by the AGC circuit. Therefore, a great gain increase as indicated by a characteristic curve (c) in FIG. 13 cannot be provided.

FIG. 13 is a graph showing characteristic curves in exposure control and gain control. The illuminance (1×) is plotted along the abscissa in FIG. 13, and the controlled signal level is plotted along the ordinate in FIG. 13. The characteristic curve (a) in FIG. 13 shows characteristics under exposure control. The amount of incident light can be controlled to be an optimal signal level upon exposure control such as opening/closing of an aperture for an optical image having an illuminance of 10 1× or more. In this case, the illuminance of 10 1× corresponds to an exposure control limit in a fully open aperture state. The characteristic curve (b) in FIG. 13 is a composite characteristic curve when exposure control and gain control are performed. Gain control aims at compensating for a delay of exposure control when the illuminance is 10 1× or more. Level control is performed such that a signal level comes close to the optimal signal level at an illuminance of 10 1× or less.

The above problem is not limited to the video camera described above but is also experienced when random noise is generated together with an image signal. For example, the same problem as described above is posed, e.g., when an image signal is transferred through a system which generates random noise.

SUMMARY OF THE INVENTION

It is an object of the present invention to provide an image signal processing apparatus capable of properly solving the individual conventional problems described above.

It is another object of the present invention to provide an image signal processing apparatus capable of minimizing a noise component generated together with an image signal even if the image signal has a high level.

It is still another object of the present invention to provide an image signal processing apparatus capable of causing an automatic gain control circuit included in an image signal processing circuit to generate an image signal and suppress an amplified noise component.

In order to achieve these objects of the present invention, there is provided an image signal processing apparatus comprising: means for supplying an image signal; noise reducing means for reducing noise of the image signal supplied from the supplying means; and means for controlling an operation of the noise reducing means in accordance with a level of the image signal supplied from the supplying means.

The above and other objects, features, and advantages of the present invention will be apparent from the following description of the preferred embodiments, taken in conjunction with the accompanying drawings.

BRIEF DESCRIPTION OF THE DRAWINGS

FIG. 7 is a block diagram of an image signal processing apparatus according to still another embodiment of the present invention;

FIG. 13 is a graph showing exposure control and gain control;

FIG. 14 is a block diagram showing an arrangement of a field cyclic noise reduction circuit;

FIG. 15 is a graph showing gain characteristics of AGC circuits 20 and 42 and an AGC circuit 48; and FIG. 16 is a block diagram showing the relationship between an operation unit 250 and a controller 251.

DETAILED DESCRIPTION OF THE PREFERRED EMBODIMENTS

The preferred embodiments of the present invention will be described with reference to the accompanying drawings.

Each embodiment to be described below discloses an image signal processing apparatus basically comprising an input means for inputting a video signal, a field memory, a multiplying means for multiplying a signal delayed by a period of one-field by the field memory with a coefficient k ($<1$), a means for adding an output from the multiplying means and an input signal from the input means and supplying the resulting sum signal to the field memory, a comparing means for comparing a level of the signal read out from the field memory with a predetermined value, and a means for substantially inhibiting a video signal input from the input means to the adding means in accordance with a comparison result obtained by the comparing means. Since the signal obtained by multiplying the immediately preceding field signal with the coefficient k, and the signal of the present field, are cyclically added by the multiplying means and the adding means, the amplitude can be gradually increased even if amplitudes of the input image signals are small. The comparing means inhibits an addition of a new field signal when the level of the signal stored in the field memory is increased to a predetermined level, and therefore the storage signal level can be optimally maintained. This apparatus is effectively used in an apparatus for handling an image signal output form an image pickup element such as a CCD element.

Figure 1:
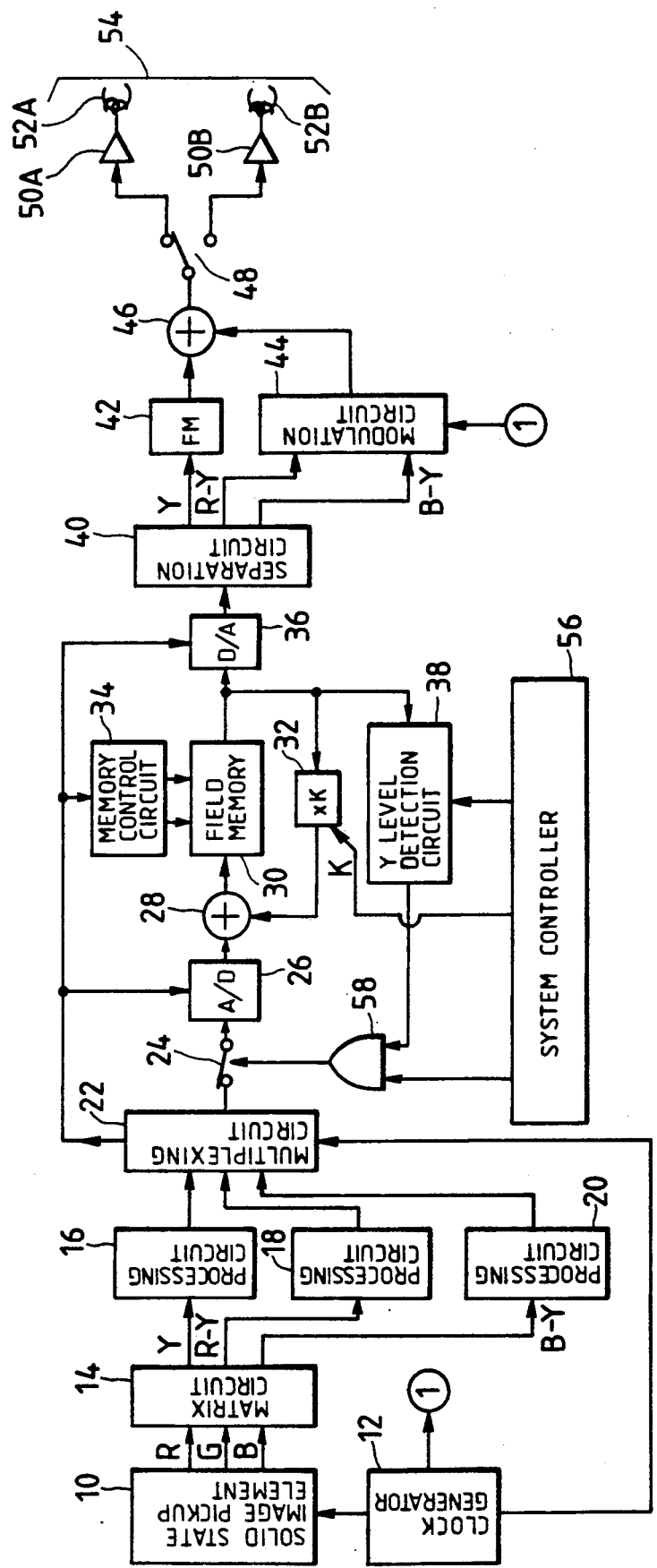
FIG. 1 is a block diagram showing an image signal processing apparatus according to an embodiment of the present invention.

FIG. 1 is a block diagram showing an embodiment in which the above arrangement is applied to a "camera integral type" VTR. The VTR includes an image pickup circuit 10 including a solid state image pickup element and its driver. The image pickup circuit 10 outputs R, G, and B image pickup signals in response to clocks output from a clock generator 12. A matrix circuit 14 receives the R, G, and B signals and generates a luminance signal Y ($=0.3R+0.59G+0.11B$), and color difference signals R-Y and B-Y. These output signals are subjected to gamma-correction and aperture correction by processing circuits 16 to 20. A multiplexing circuit 22 receives the signals Y, R-Y, and B-Y from the processing circuits 16 to 20 and outputs them time-divisionally. A detailed arrangement of the multiplexing circuit 22 is shown in FIG. 3.

Figure 3:
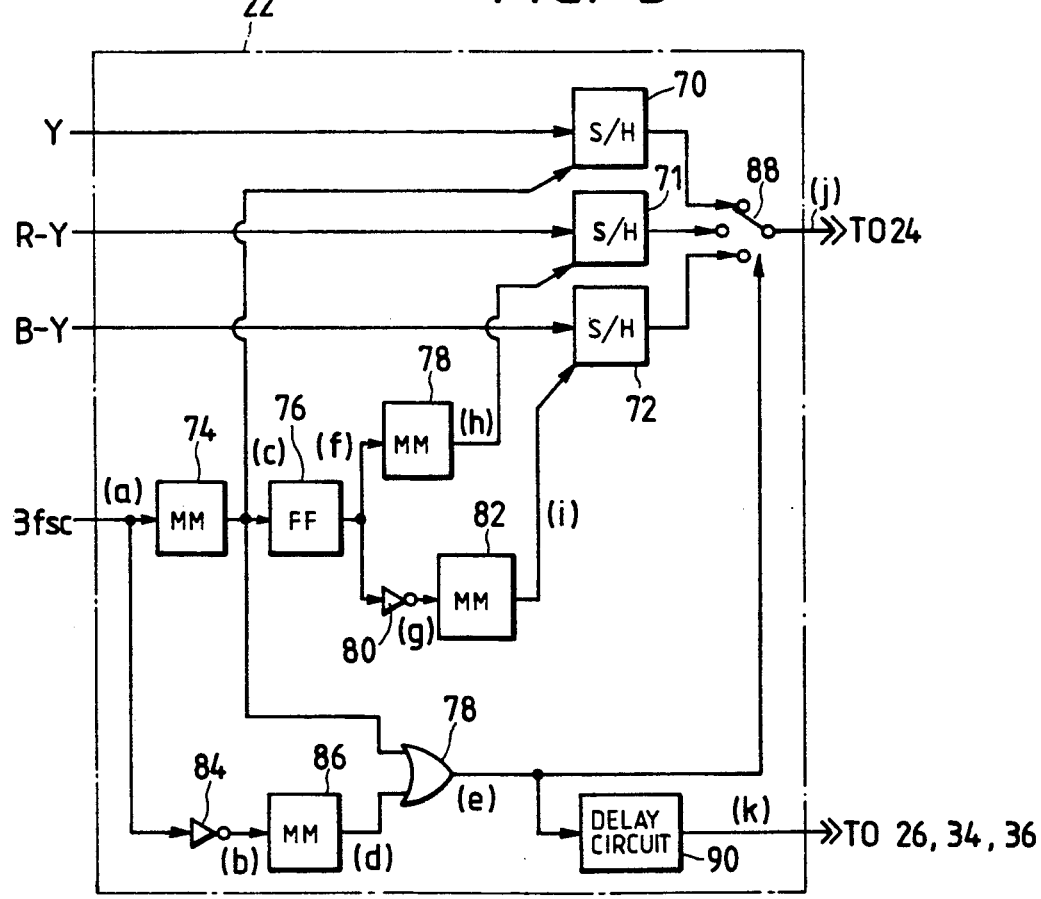
FIG. 3 is a block diagram showing a detailed arrangement of a multiplexing circuit 22 shown in FIG. 1.

Referring to FIG. 3, sample/hold (S/H) circuits 70, 71, and 72 sample and hold the signals Y, R-Y and B-Y at the following timings. More specifically, a monostable multivibrator (MM) 74 outputs a pulse (FIG. 4(c)) in synchronism with a leading edge of a clock (FIG. 4(a)) of $3f_{SC}$ (where $f_{SC}$ is the frequency of a color subcarrier) from the clock generator 12. The pulse output form the MM 74 is supplied to the S/H circuit 70, a flip-flop (FF) 76, and an OR gate 78. The FF 76 inverts an output in synchronism with an input pulse and serves as a ½ frequency divider. An output waveform of the signal from the FF 76 is shown in (f) of FIG. 4. A monostable multivibrator (MM) 78 outputs a pulse (FIG. 4(h)) in synchronism with a trailing edge of an output from the FF 76. The S/H cricuit 71 samples and holds the signal R-Y in response to an output pulse from the MM 78. The output from the FF 76 is inverted by an inverter 80 (FIG. 4(g)). A monostable multivibrator (MM) 82 supplies to the S/H circuit 72 a sampling pulse (FIG. 4(i)) synchronized with a leading edge of an output from the inverter 80.

Figure 4:
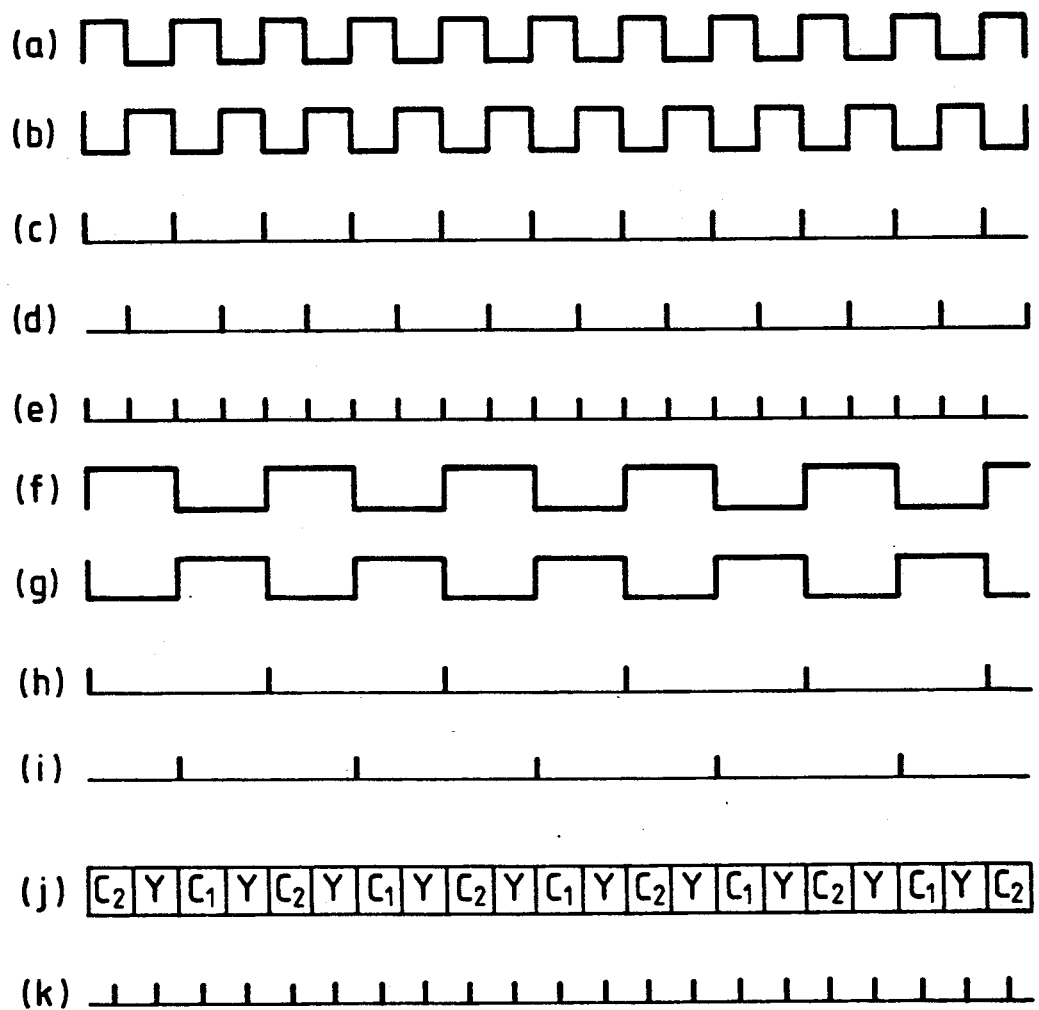
FIG. 4 is a set of timing charts of the multiplexing circuit shown in FIG. 3.

The $3f_{SC}$ clock is inverted by an inverter 84 (FIG. 4(b)), and a monostable multivibrator (MM) 86 outputs a pulse (FIG. 4(d)) synchronized with a leading edge of an output from the inverter 84. The OR gate 78 outputs an OR signal (FIG. 4(e)) of the outputs from the MMs 74 and 86. A switch 88 for selecting one of the outputs from the S/H circuits 70 to 72 is switched in response to an output from the OR gate 78. An output from the switch 88 serves as a time-divisionally multiplexed signal, as shown in (j) of FIG. 4. One color difference signal is given as $C_1$, and the other color difference signal is given as $C_2$. The output from the OR gate 78 is also supplied to a delay circuit 90 having a delay time corresponding to ½ period. An output (FIG. 4(k)) from the delay circuit 90 is supplied to an A/D converter 26, a memory control circuit 34, and a D/A converter 36 shown in FIG. 1.

Referring again to FIG. 1, an output signal from the multiplexing circuit 22 is supplied to the A/D converter 26 through a switch 24. The opening/closing timing of the switch 24 will be described later. The A/D converter 26 samples the input signal at a timing shown in (k) of FIG. 4 and converts it into an 8-bit digital signal. An adder 28 adds an output from the A/D converter 26 and an output from the multiplier 32 and supplies a sum signal to a field memory 30. The field memory 30 is a memory capable of real-time write/read operation. The memory control circuit 34 supplies write and read address signals to the memory 30 in response to pulses (FIG. 4(k)) form the multiplexing circuit 22. A signal read out from the field memory 30 is supplied to the D/A converter 36, the multiplier 32, and a level detection circuit 38. The multiplier 32 multiplies an input signal with k ($<1$) and supplies a multiplied signal to the adder 28. The level detection circuit 38 averages one field of luminance data and compares the average value with a predetermined value. If the average value is larger than the predetermined value, the detection circuit 38 outputs a signal of logic "0". Otherwise, the detection circuit 38 outputs a signal of logic "1".

A separation circuit 40 basically performs processing opposite to the multiplexer circuit 22. For example, after the time-divisionally multiplexed signals Y, R-Y and R-B are sampled and held at predetermined timings, high-frequency components are eliminated by a low-pass filter, thereby restoring the signals. An FM modulation circuit 42 performs FM-modulation of the signal Y. An orthogonal two-phase modulation circuit 44 performs orthogonal two-phase modulation of an AC wave of a frequency $f_{LSC}$ (0.629 MHz in the VHS standard) with the signals R-Y and B-Y. A mixer 46 mixes the outputs from the FM modulation circuit 42 and the modulation circuit 44. The output from the mixer 46 is selectively supplied to an amplifier 50A or 50B by a switch 48. The signal is recorded by a magnetic head 52A or 52B on a magnetic tape 54. The switch 48 is switched every field, as is well known to those skilled in the art.

The VTR of this embodiment also includes a system controller 56 for controlling the overall apparatus and an AND gate 58 for outputting a signal for controlling opening/closing of the switch 24.

Figure 2:
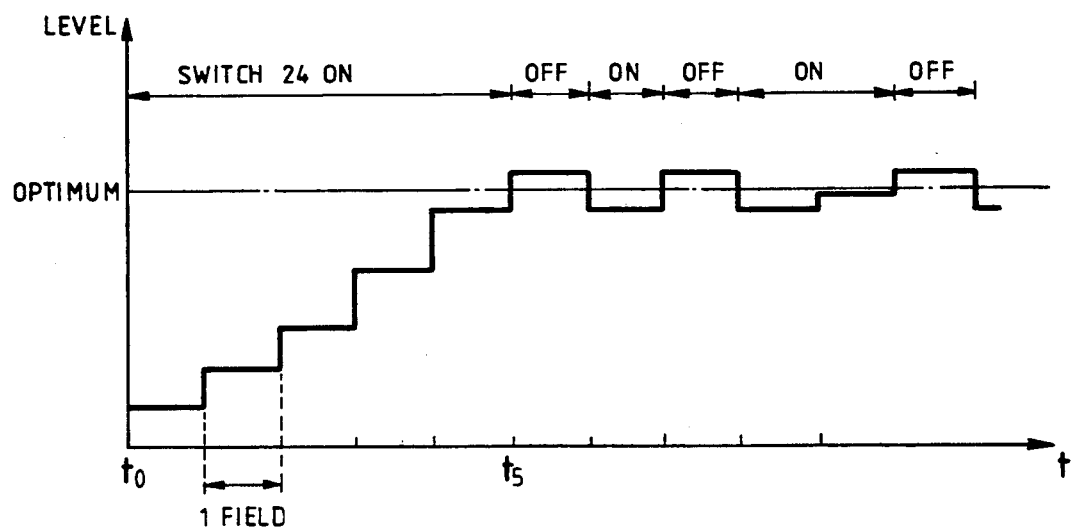
FIG. 2 is a timing chart showing an operation of the image signal processing apparatus in FIG. 1.

A low-speed shutter function of this embodiment will be described in detail. When this function is to be effected, a signal of logic "1" from the system controller 56 is always supplied to the AND gate 58. In the initial state, the switch 24 is set to be ON. The adder 28 adds the signal of the present field (from the A/D converter 26) and the signal obtained by multiplying the signal of the immediately preceding field with k from the multiplier 32. A sum signal from the adder 28 is stored in a corresponding storage area in the field memory 30. The above operation is repeated to sequentially increase the magnitude of the signal stored in the field memory 30. A cumulative average value of one field detected by the level detection circuit 38 thus comes close to the optimal level, as indicated by time t0 to time t5 in FIG. 2.

When the signal average value exceeds the optimal level at time 5, the output from the level detection circuit 38 is changed from logic "1" to logic "0", so that the output from the AND gate 58 becomes logic "0". Therefore, the switch 24 is turned off. Then, no new field signal from the multiplexer circuit 22 is supplied to the adder 28. A storage value of the field memory 30 is multiplied with k (<1) by a loop of the multiplier 32 and the adder 28. The average level is reduced by the value obtained by multiplying the storage value with k. When the average level becomes lower than the level represented by the optimal value, an output from the level detection circuit 38 goes to logic "1", and the switch 24 is turned on. A new field signal is supplied to the adder 28, and the average level of the storage signal in the memory 30 can be increased.

The above operation is repeated to maintain the average level of the storage signal of the field memory 30 around the optimal value. When the low-speed shutter function is not effected in FIG. 1, the loop portion of the multiplier 32 is released or the coefficient k is set to be zero.

However, the level reference value of the level detection circuit 38 may be changed in accordance with various factors or conditions. The ON/OFF operation of the switch 24 may be directly controlled by the output from the level detection circuit 38 without using the AND gate 58.

Figure 5:
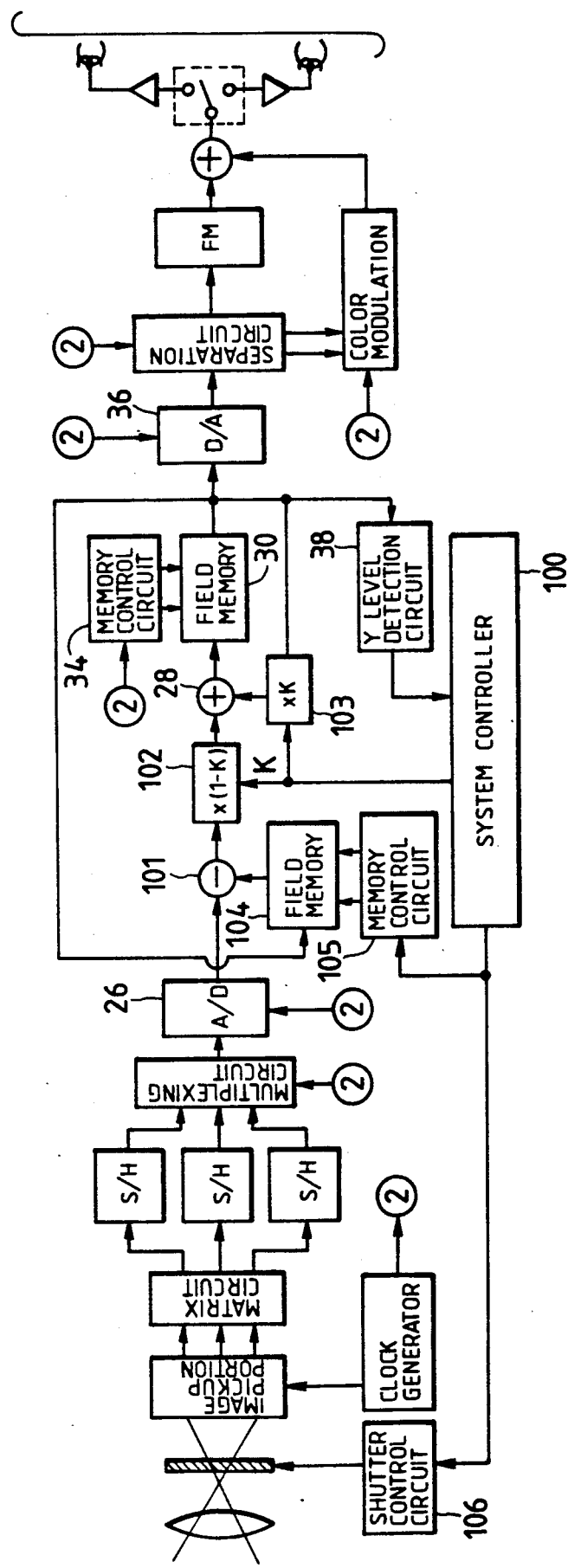
FIG. 5 is a block diagram showing an image signal processing apparatus according to another embodiment of the present invention.

FIG. 5 is a block diagram showing another embodiment of the present invention. This embodiment is substantially the same as that in FIG. 1 except that a permanent pattern noise reduction circuit is partially used and a shutter unit is provided. A low-speed shutter function block will be described. This function block comprises a system controller 100, a subtracter 101, a multiplier 102 having a coefficient (1−k), a multiplier 103 having a coefficient k, a field memory 104 for storing permanent pattern noise, a control circuit 105 for the memory 104, and a shutter control circuit 106 for controlling the ON/OFF operation of the shutter. The shutter control circuit 106 opens/closes the shutter within a predetermined period of time in accordance with a command from the system controller 100. As in the embodiment of FIG. 1, a cyclic accumulation operation is repeated by the circuits 102, 103, and 28. In order to eliminate the cumulative permanent pattern noise, the contents of the permanent pattern field memory 104 are read out under the control of the memory control circuit 105 and are supplied to the subtracter 101. Normal photography is performed under the control of the shutter control circuit 106 while the shutter is kept open.

According to this embodiment, as can be understood from the above description, actual sensitivity can be increased. In addition, since the storage time of the image pickup element is not changed, noise is not increased. Random noise generated at the output unit of the image pickup element can be reduced.

A still further embodiment will be described in which the noise reduction capacity of a noise reduction circuit using a field memory is controlled in accordance with a given image signal level to prevent image blurring caused by unnecessary noise reduction processing.

Figure 6:
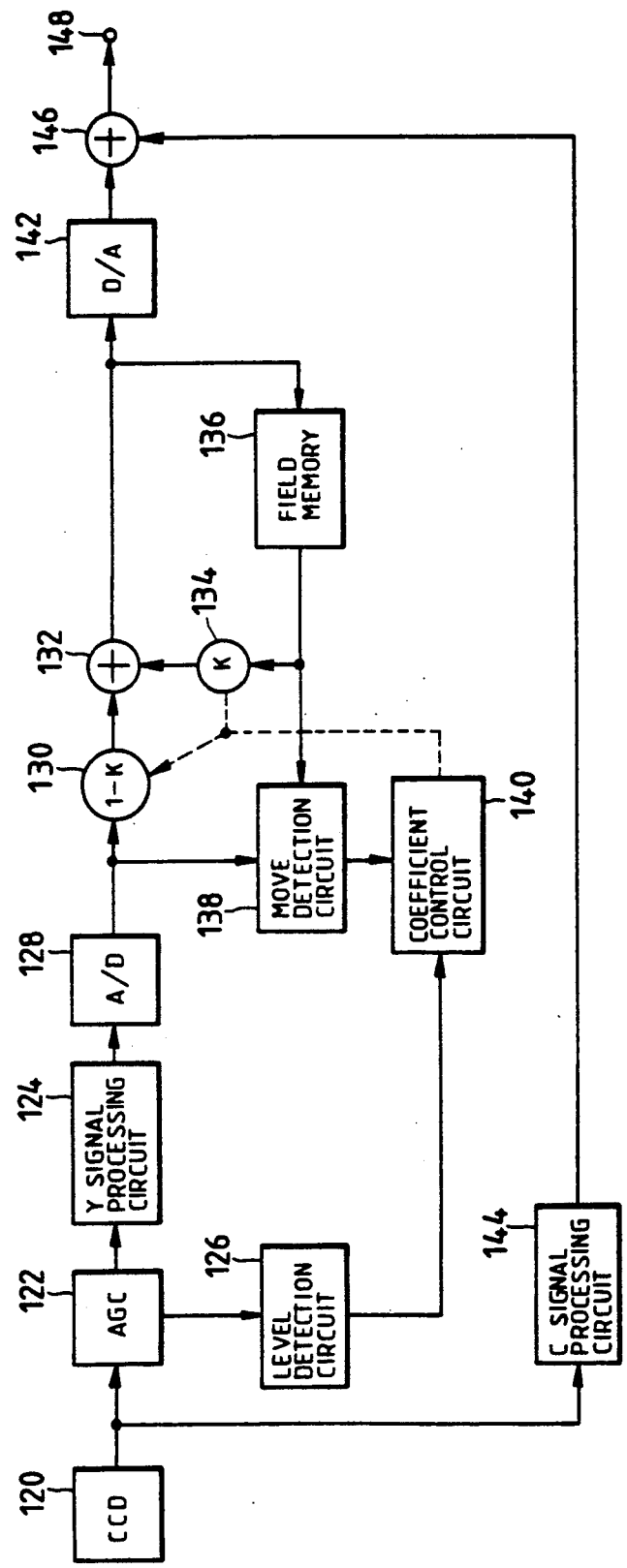
FIG. 6 is a block diagram showing an arrangement in which the present invention is applied to a video camera.

FIG. 6 is a block diagram showing an embodiment in which the image signal processing apparatus is applied to a video camera.

Figure 8:
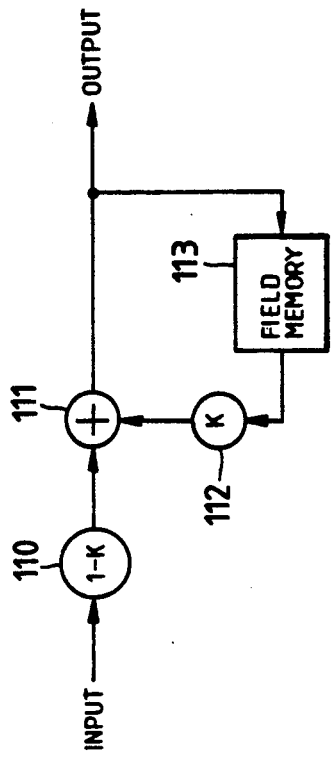
FIG. 8 is a block diagram showing a basic arrangement of a conventional noise reduction circuit.

Referring to FIG. 6, the video camera includes an image pickup circuit 120 including a CCD image sensor for converting an optical image into an electrical signal and a driver for the CCD image sensor. The video camera also includes an automatic gain control (AGC) circuit 122 for extracting only a luminance (Y) signal of the outputs from the image pickup circuit 120 and controlling the gain in accordance with an output signal level, a Y signal processing circuit 124 including a gamma-correction circuit and an edge correction circuit, a level detection circuit 126 for detecting a level of the luminance signal Y, and an A/D converter 128. The video camera further includes a multiplier 130 having a coefficient (1−k), an adder 132, a multiplier 134 having a coefficient K, and a field memory 136. The circuits 130 to 136 are the same as the circuits 110 to 113 in FIG. 8 and constitute a cyclic noise reduction circuit.

The video camera also includes a move detection circuit 138 for comparing the signal of the present field with the signal of the immediately preceding field from the field memory 136 and determining whether the field represents a move portion or a still portion, a coefficient control circuit 140 for controlling coefficinets K of the multipliers 130 and 134 in accordance with detection results from the level detection circuit 126 and the move detection circuit 138, a D/A converter 142, a chrominance (C) signal processing circuit 144 for converting the singals (R-Y) and (B-Y) of the base band into chrominance signals after edge correction and the like, a mixer 146 for mixing the luminance signal and the chrominance signals in accordance with frequency multiplexing, and an output terminal 148 for a composite video signal.

The operation of the circuit in FIG. 6 will be described below. When a detection level of the level detection circuit 126 is higher than a level represented by the predetermined value, the coefficinet control circuit 140 sets the coefficients K of the multipliers 130 and 134 to be zero, thereby inhibiting noise reduction operation. However, when the detection level is lower than that corresponding to the predetermined value, a move signal from the move detection circuit 138 is checked. If the move signal represents a move portion of the image, the coefficient K is set to be, e.g., zero, thus inhibiting the noise reduction operation. However, if the move signal represents a still portion of the image, the coefficient K is set to be, e.g., 0.5, thereby effecting noise reduction. In general, noise is considered to remain more or less at a predetermined level regardless of the signal level. Only when the signal level is set to be the predetermined value or less, can noise reduction can be effectively performed. In this embodiment, noise reduction processing is allowed or inhibited in accordance with the signal level. However, a noise reduction capacity may be adjusted in accordance with the signal level.

In the above embodiment, noise reduction processing is performed only for the signal Y. However, noise reduction processing may be also performed for the signals C to reduce color noise. In addition, noise reduction processing may be used in a reproduction system in a video tape recorder.

FIG. 7 is a block diagram showing still another embodiment of the present invention. The same reference numerals as in FIG. 6 denote the same parts in FIG. 7. The circuit in FIG. 7 includes a multiplier 150 for multiplying an output from an A/D converter 128 with a coefficient (1−L), a multiplier 152 for multiplying an output from a field memory 136 with a coefficient L, and an adder 154 for adding outputs from the multiplier 150 and the multiplier 152. An output from the adder 154 is input to a D/A converter 142. A level detection circuit 156 detects a level of a signal Y in the same manner as the level detection circuit 126 in FIG. 6. The coefficient L of the multipliers 150 and 152 is controlled in accordance with an output from the level detection circuit 156. A move detection circuit 158 is the same as the circuit 138 in FIG. 6 and detects a move in accordance with correlation between the signal of the current field and the signal of the immediately preceding field from the field memory 136. A variable K of the multipliers 130 and 134 is controlled in accordance with an output from the move detection circuit 158.

In the circuit shown in FIG. 7, the multiplier 130, the adder 132, the multiplier 134, and the field memory 136 are used to perform cyclic noise reduction processing in the same manner as in FIG. 6. The variable K of the multipliers 130 and 134 is controlled in accordance with the output from the move detection circuit 158. Therefore, the noise reduction capacity is controlled in accordance with the presence/absence of a move. The coefficient K is larger than that in the conventional noise reduction circuit so that the noise reduction effect can be increased even if the after image effect is slightly increased.

A signal obtained by multiplying the signal of the current field with the coefficient (1−L) and a signal obtained by multiplying an output (e.g., a cyclically noise-reduced image of the immediately preceding field) with the coefficient L from the field memory 136 are added by the adder 154 in accordance with the output from the level detection circuit 156. When the level of the signal Y exceeds the predetermined value, noise reduction is inhibited or slightly performed, as previously described. In this case, the coefficient L is set to be zero or near zero. Only the signal of the current field appears from the D/A converter 142, i.e., an output terminal 148. However, if the Y signal level is lower than the level corresponding to the predetermined value, noise reduction is required. A noise-reduced output from the field memory 136 in accordance with the move detection is frequently employed In this case, the coefficient L is set to be 1 or near 1.

The same processing circuit as described above in the embodiment of FIG. 7 may be arranged for the signals C.

As can be easily understood from the above description according to the present invention, adaptive noise reduction processing is performed in accordance with the signal level. Therefore, generation of an after image and unclearness of the edge can be effectively suppressed without degrading the noise reduction effect.

An image signal processing apparatus will be described in which an operation of a noise reduction processing circuit using a field memory is controlled in accordance with the degree of automatic gain control, and noise reduction can be performed when a noise component generated together with the image signal is undesirably amplified depending on automatic gain control.

A still another embodiment based on the above principle will be described with reference to the accompanying drawings.

Figure 9:
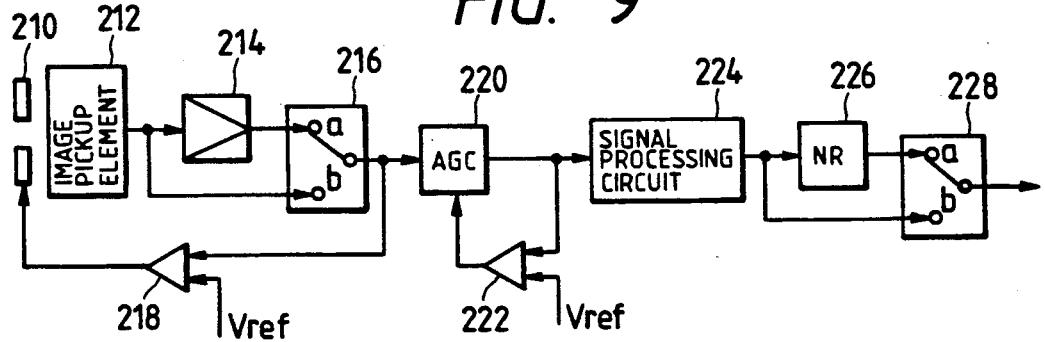
FIGS. 9, 10, 11, and 12 are block diagrams of image signal processing apparatuses according to other embodiments of the present invention, respectively.

FIG. 9 is a block diagram showing an image signal processing apparatus of this embodiment. The apparatus includes an aperture (iris) 210, an image pickup element 212 for converting an optical image into an electrical signal, an amplifier 214, a switch 216 for selecting an output from the amplifier 214 or a direct output from the image pickup element 212, and a differential amplifier 218 for comparing an output from the switch 216 with a reference voltage Vref and outputting a difference voltage. The aperture 210 is controlled in accordance with an output from the differential amplifier 218. The reference voltage Vref corresponds to the optimal level in FIG. 13. The image signal processing apparatus also includes an AGC circuit 220 for adjusting an output level of the switch 216, and a differential amplifier 222 for comparing an output level of the AGC circuit 220 with the reference voltage Vref and otuputting a difference voltage. The gain of the AGC circuit 220 is controlled in accordance with an output from the differential amplifier 222. The image signal processing apparatus further includes a signal processing circuit 224 for performing known video signal processing, a field cyclic noise reduction circuit 226, and a switch 228 for selecting an output from the signal processing circuit 224 or an output from the noise reduction circuit 226.

An operation of the apparatus shown in FIG. 9 will be described below. When an optical image has a high illuminance, the same operation as in the conventional video camera can be performed. In this case, the switch 216 is set in the b contact position to directly supply an output from the image pickup element 212 into the AGC circuit 220. The switch 228 is set in the b contact position to omit noise reduction processing (normal photographic mode). The characteristic curve (b) shown in FIG. 13 can be obtained at the output of the AGC circuit 220. In this mode, the noise reduction circuit 226 is not used to prevent the after image of the moving object.

However, when an optical image has a low illuminance, the switches 216 and 228 are set at the a contact positions (high-sensitivity photographic mode). In this case, a signal amplified by the amplifier 214 is input to the AGC circuit 220. The characteristic curve (c) in FIG. 13 can be obtained at the output terminal of the AGC circuit 220. In this mode, the noise level is amplified in the same manner as in the signal level at the output of the AGC circuit 220. The switch 228 is switched to the a contact position to cause the noise reduction circuit 226 to perform noise reduction.

FIG. 14 shows a known arrangement of a field cyclic noise reduction circuit as the noise reduction circuit 226. The noise reduction circuit 226 includes an A/D converter 230, a subtracter 232, a multiplier 234 having a coefficient K ($0 < K \leqq 1$), an adder 236, a field memory 238 serving as a one-field delay circuit, and a D/A converter 240. This noise reduction circuit reduces random noise without interfield correlation, and an after image is left in a mdving object.

Figure 10:
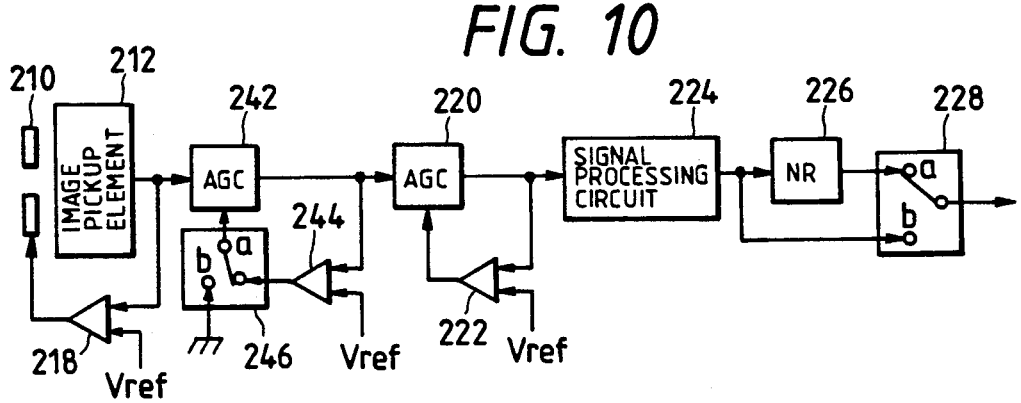

FIG. 10 is a block diagram showing a noise reduction circuit according to still another embodiment of the present invention. The same refernce numerals as in FIG. 9 denote the same parts in FIG. 10. The noise reduction circuit in FIG. 10 includes a second AGC circuit 242, a differential amplifier 244 for comparing an output from the AGC circuit 242 with the reference voltage Vref and outputting a difference voltage, and a switch 246 for selecting an output from the differential amplifier 244 or a predetermined potential (a ground potential in this embodiment) and applying a selected signal to the gain control terminal of the AGC circuit 242. The amplifier 214 and the switch 216 of FIG. 9 are omitted, and the above circuits are connected to the input terminal of the AGC circuit 20. In the normal photographic mode, the switch 246 is connected to the b contact side. The AGC circuit 242 outputs the input signal without modifications. The switch 228 is connected to the b contact side in the same manner as in the embodiment of FIG. 9, thereby omitting noise reduction processing.

In the high-sensitivity photographic mode, the switch 246 is connected to the a contact side. The gain of the AGC circuit 242 is controlled in accordance with an output signal from the differential amplifier 244, thus effecting the AGC function. When the optical image has a low illuminance, the two AGC circuits 242 and 220 are operated to further increase the gain. In this mode, the switch 228 is connected to the a contact side in the same manner as in FIG. 9, and noise reduction processing is performed by the noise reduction circuit 226.

Figure 11:
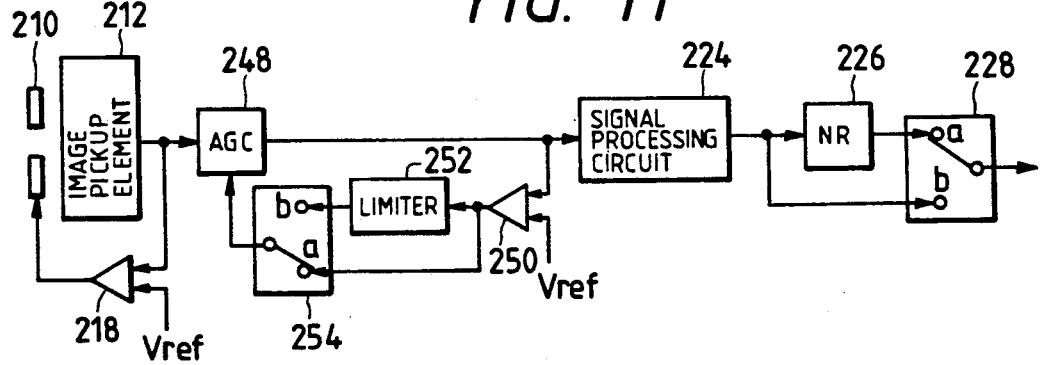

FIG. 11 is a block diagram of a noise reduction circuit according to still another embodiment. In this noise reduction circuit, a portion consisting of the AGC circuit 242, the differential amplifier 244, and the switch 246 in FIG. 10 is modified. The noise reduction circuit in FIG. 11 includes an AGC circuit 248 having a larger gain than that of the AGC circuit 220, a differential amplifier 250 for comparing an output from the AGC circuit 248 with the reference voltage Vref and outputting a difference voltage, a limiter 252 for limiting an output from the differential amplifier 250, and a switch 254 for selecting an output from the differential amplifier 250 or an output from the limiter 252 and applying the selected signal to the gain cotnrol terminal of the AGC circuit 248. The gain characteristic of the AGC circuit 248 is represented by a characteristic curve 260 in FIG. 15, while the gain characteristic of the AGC circuits 220 and 242 is represented by a characteristic curve 262 in FIG. 15. The control voltage is plotted along the abscissa in FIG. 15. The limiting level of the limiter 252 is preset to be L in FIG. 15.

In the normal photographic mode, the switch 254 in FIG. 11 is connected to the b contact side. The AGC circuit 248 is controlled in accordance with an output from the limiter 252. Since the limiting level of the limiter 252 is set to be L in FIG. 15, the AGC circuit 248 exhibits the characteristics represented by the characteristic curve 62 in FIG. 15 and is operated in the same manner as in the AGC circuit 220. In this mode, the switch 228 is connected to the b contact side and noise reduction processing is not performed.

However, in the high-sensitivity photographic mode, the switch 254 is connected to the a contact side, and the AGC circuit 248 is directly controlled in accordance with an output from the differential amplifier 250. The characteristics of the AGC cirucit 248 are represented by the characteristic curve 260 in FIG. 15, thereby increasing the gain as a whole.

Figure 12:
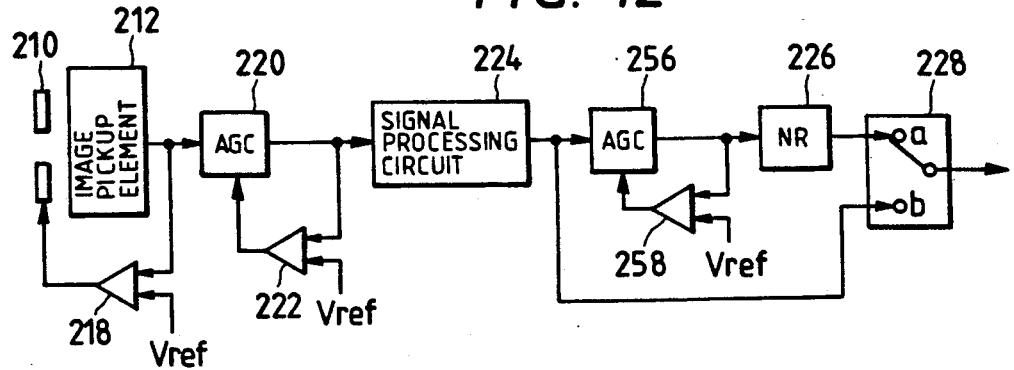

FIG. 12 is a block diagram of a noise reduction circuit according to still another embodiment of the present invention. The same reference numerals as in FIG. 9 denote the same parts in FIG. 12. As compared with the circuit shown in FIG. 9, an AGC circuit is arranged between a signal processing circuit 224 and a noise reduction circuit 226, and the amplifier 214 and the switch 216 in FIG. 9 are omitted. The noise reduction circuit in FIG. 12 includes an AGC circuit 256 and a differential amplifier 258 for comparing an output from the AGC circuit 256 with the reference voltage Vref and outputting a difference voltage. The AGC circuit 256 is controlled in accordance with an output voltage from the differential amplifier 258. The embodiment in FIG. 12 has an arrangement wherein the AGC circuit 242 and the differential amplifier 244 for controlling it in FIG. 10 are connected between the signal processing circuit 224 and the noise reduction circuit 226, thereby omitting the switch 246.

In the embodiment of FIG. 12, in the normal photographic mode, the switch 228 is connected to the b contact side. The AGC circuit 256 and the noise reduction circuit 226 are not operated as in the conventional circuit arrangement. However, in the high-sensitivity photographic mode, the switch 228 is connected to the a contact side, and an output from the signal processing circuit 224 is further amplified by the AGC circuit 256. Noise can be reduced by the noise reduction circuit 226. Although an after image is generated for a moving object, the S/N ratio can be increased.

In each embodiment described above, the manual switch 250 shown in FIG. 16 is arranged, and the controller 251 operates the switches in the circuits to set a desired mode in accordance with the states of the switches. However, the controller 251 may detect the output level of the image pickup element 212 or the gain signals of the AGC circuits 220, 242, and 248, and the switches 216, 228, 246, and 254 may be automatically switched.

The above embodiments exemplify video cameras. However, the present invention is not limited to video cameras, but can be extended to a noise generating system in an electrical signal processing circuit.

As can be easily understood from the above description, the S/N ratio is not decreased at a low illuminance. According to the embodiments of the present invention, even if a signal having a low level is to be processed, its S/N ratio is not degraded.

What is claimed is:

1. An image signal processing apparatus comprising:
   means for amplifying an input image signal with a predetermined gain, wherein said input image signal is an image signal supplied from an image pickups element;

means for reducing noise of the image signal amplified by said amplifying means;

means for detecting a level of the input image signal; and means for controlling an operation of said noise reducing means and said amplifying means in accordance with an output of said detecting means.

2. An apparatus according to claim 1, wherein said noise reducing means includes:

a memory for storing the image signal; and means for controlling write access of the image signal in said memory, said write access controlling means reducing the noise by adding image signals written in said memory.

3. An apparatus according to claim 1, wherein said operation controlling means controls said noise reducing means not to perform noise reduction when a gain of said amplifying means is smaller than a predetermined level.

4. An apparatus according to claim 1, further comprising means for changing the gain of said amplifying means.

5. An image signal processing apparatus, comprising:

means for amplifying an input iamge signal with a predetermined gain;

means for reducing noise of the input iamge signal amplified by said amplifying means;

means for detecting a level of the input image signal;

means for controlling an operation of said noise reducing means and said amplifying means in accordance with an output of said detecting means; and means for changing the gain of said amplifying means, said changing means including a manual switch for changing the gain of said amplifying means and automatic gain control means for automatically controlling gain in accordance with a level of the input image signal.

6. An apparatus according to claim 5, wherein said input image signal is an image signal supplied from an image pickup element.

7. An apparatus according to claim 5, wherein said noise reducing means includes:

a memory for storing the input image signal; and means for controlling write access of the input image signal in said memory, said write access controlling means reducing the noise by adding image signals written in said memory.

8. An apparatus according to claim 5, wherein said operation controlling means controls said noise reducing means not to perform noise reduction when the gain of said amplifying means is smaller than a second predetermined gain.

9. An image signal processing apparatus comprising:

means for amplifying an input image signal with a predetermined gain;

means for reducing noise of the input image signal amplified by said amplifying means, said noise reducing means further comprising memory means for storing the input image signal;

means for detecting a level of the input image signal; and means for controlling an operation of said noise reducing means and said amplifying means in accordance with an output of said detecting means, wherein said memory comprises a memory for storing at least a one-frame image signal.

10. An apparatus according to claim 9, wherein said memory comprises a field memory.

11. An apparatus according to claim 9, wherein said input image signal is an image signal supplied from an image pickup element.

12. An apapratus according to claim 9, wherein said operation controlling means controls said noise reducing means not to perform noise reduction when the gain of said amplifying means is smaller than a predetermined gain.

13. An apparatus according to claim 9, further comprising means for changing the gain of said amplifying means.

14. An image signal processing apparatus comprising:

means for amplifying an input image signal with a predetermined gain;

a field cyclic processing circuit having a field memory, for processing the input image signal amplified by said amplifying means, by combining an image signal delayed by said field memory and the input image signal amplified by said amplifying means and not delayed by said field memory;

means for detecting a level of the input image signal; and means for controlling an operation of said processing circuit and said amplifying means in accordance with an output of said detecting means.

15. An apparatus according to claim 14, wherein said control means interrupts the operation of said processing circuit in accordance with the predetermined gain.

16. An image processing apparatus comprising:

(a) means for amplifying an input image signal with a predetermined gain;

(b) field cyclic noise reduction means for reducing a noise component of said amplifying means, said field cyclic noise reduction means reducing noise by combining two successive field image signals, in a ratio corresponding to a first parameter; and (c) means for controlling the first parameter in accordance with a second parameter, corresponding to said amplifying means.

17. An image processing apparatus according to claim 16, wherein said field cyclic noise reduction means includes a field memory for storing the input image signal amplified by said amplifying means and addition means for adding the image signal stored in said field memory and an image signal not stored in said field memory, in the ratio corresponding to the parameter.

18. An image processing apparatus according to claim 16, further comprising:

(d) means for generating the input image signal.

19. An image processing apparatus according to claim 18, wherein said generating means comprises a CCD.

* * * * *